United States Patent
Wang et al.

(10) Patent No.: US 10,365,922 B1
(45) Date of Patent: Jul. 30, 2019

(54) DISTRIBUTED-LEDGER BASED ENTERPRISE APPLICATION DEPLOYMENT AND MANAGEMENT

(71) Applicant: SAP SE, Walldorf (DE)

(72) Inventors: Qiu Shi Wang, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/949,339

(22) Filed: Apr. 10, 2018

(51) Int. Cl.
*G06F 8/65* (2018.01)
*H04L 9/32* (2006.01)
*G06F 21/57* (2013.01)
*H04L 29/06* (2006.01)

(52) U.S. Cl.
CPC ............. *G06F 8/65* (2013.01); *G06F 21/57* (2013.01); *H04L 9/3247* (2013.01); *H04L 63/12* (2013.01)

(58) Field of Classification Search
CPC .... G06F 8/60–66; G06F 3/1225; G06F 3/123; G06F 21/30; G06F 21/305; G06F 21/44–45; G06F 21/50; G06F 21/57; G06F 21/572; H04L 9/08; H04L 9/3247; H04L 63/12
See application file for complete search history.

(56) References Cited

U.S. PATENT DOCUMENTS

| | | | |
|---|---|---|---|
| 8,312,419 B2 | 11/2012 | Wilcock et al. | |
| 8,762,929 B2 | 6/2014 | Driesen | |
| 9,274,784 B2 | 3/2016 | Wang et al. | |
| 9,336,060 B2 | 5/2016 | Nori et al. | |
| 9,569,771 B2 | 2/2017 | Lesavich et al. | |
| 10,057,243 B1 * | 8/2018 | Kumar | H04L 9/0825 |
| 2017/0046651 A1 | 2/2017 | Lin et al. | |
| 2018/0176229 A1 * | 6/2018 | Bathen | G06F 8/65 |

OTHER PUBLICATIONS

Lee, B., et al., "Blockchain-based secure firmware update for embedded devices in an Internet of Things environment", Springer [online], 2016 [retrieved Apr. 26, 2019], pp. 1152-1167.*

(Continued)

*Primary Examiner* — Todd Aguilera
(74) *Attorney, Agent, or Firm* — Fish & Richardson P.C.

(57) ABSTRACT

Methods, systems, and apparatus, including computer programs encoded on a computer storage medium, for a distributed ledger based management of an enterprise application lifecycle. In one aspect, a method includes receiving a notification regarding an availability of a latest version of an application; generating a transaction proposal that includes key value pairs and a unique signature; providing the transaction proposal to a plurality of peer nodes; receiving a proposal response from at least a portion of the peer nodes, each of the proposal responses including a verification of the unique signature; generating an endorsed transaction proposal based on validating the proposal responses according to an endorsement policy; providing the endorsed transaction proposal to an application management service; receiving the latest version of the application and a block of transactions, wherein the block of transactions includes the key value pairs; and storing the block of transactions to a distributed ledger.

20 Claims, 6 Drawing Sheets

(56) References Cited

OTHER PUBLICATIONS

Boudguiga, A., et al., "Towards Better Availability and Accountability for IoT Updates by means of a Blockchain", IEEE European Symposium of Sercurity and Privacy Workshop [online], 2017 [retrieved Apr. 26, 2019], pp. 50-58.*

Dorri, A., et al., "BlockChain: A Distributed Solution to Automotive Security and Privacy" IEEE Communications Magazine, vol. 55, Iss. 12 [online], 2017 [retrieved Apr. 26, 2019], pp. 119-125.*

* cited by examiner

DISTRIBUTED-LEDGER BASED ENTERPRISE APPLICATION DEPLOYMENT AND MANAGEMENT

BACKGROUND

The process involved with delivering, deploying, and upgrading enterprise applications has become complex and involves multiple environments. This process may begin by customers selecting an application from a catalogue. Once selected, the application may have to be rebranded and/or customized by, for example, a third-party consultant. The process also may include delivery of the application to the customer, configuration and setup of the application, and deployment to, for example, an end user device. After deployment, the process may include lifecycle management of the application, version upgrading and management, license tracking and management, usage compliance, governance, and so forth. Each of these various aspects of the process can involve different systems from various organizations. Accordingly, when an issue arises, it is often necessary to collect data and information from multiple systems of these organizations. For example, collected data may include information related to users that are actually using an application, the purpose of such use, the version currently deployed, the current license, the last upgrade, and so forth. In some cases, the collection of this data requires different teams from these organizations to work together. In some cases, the information even has to be gathered manually.

SUMMARY

The present disclosure describes methods and systems, including computer-implemented methods, computer-program products, and computer systems for a distributed-ledger based management of an enterprise application lifecycle.

In a general implementation, systems, apparatus, and methods for receiving, from an application management service, a notification regarding an availability of a latest version of an application; generating a transaction proposal that includes key value pairs for the latest version and a unique signature for the latest version; providing the transaction proposal to a plurality of peer nodes; receiving a proposal response from at least a portion of the peer nodes, each of the proposal responses including a verification of the unique signature; generating an endorsed transaction proposal based on validating the proposal responses according to an endorsement policy, wherein the endorsed transaction proposal includes the received proposal response and the transaction proposal; providing the endorsed transaction proposal to the application management service; receiving, from the application management service and based on a verification of the endorsed transaction proposal, the latest version of the application and a block of transactions, wherein the block of transactions includes the key value pairs; and storing the block of transactions to a distributed ledger.

In another general implementation, one or more non-transitory computer-readable storage media coupled to one or more processors and having instructions stored thereon which, when executed by the one or more processors, cause the one or more processors to perform operations that include: receiving, from an application management service, a notification regarding an availability of a latest version of an application; generating a transaction proposal that includes key value pairs for the latest version and a unique signature for the latest version; providing the transaction proposal to a plurality of peer nodes; receiving a proposal response from at least a portion of the peer nodes, each of the proposal responses including a verification of the unique signature; generating an endorsed transaction proposal based on validating the proposal responses according to an endorsement policy, wherein the endorsed transaction proposal includes the received proposal response and the transaction proposal; providing the endorsed transaction proposal to the application management service; receiving, from the application management service and based on a verification of the endorsed transaction proposal, the latest version of the application and a block of transactions, wherein the block of transactions includes the key value pairs; and storing the block of transactions to a distributed ledger.

In yet another general implementation, a system includes one or more processors; and a computer-readable storage device coupled to the one or more processors and having instructions stored thereon which, when executed by the one or more processors, cause the one or more processors to perform operations comprising: receiving, from an application management service, a notification regarding an availability of a latest version of an application; generating a transaction proposal that includes key value pairs for the latest version and a unique signature for the latest version. the unique signature generated using cryptographic credentials; providing the transaction proposal to a plurality of peer nodes; receiving a proposal response from at least a portion of the peer nodes, each of the proposal responses including a verification of the unique signature; generating an endorsed transaction proposal based on validating the proposal responses according to an endorsement policy, wherein the endorsed transaction proposal includes the received proposal response and the transaction proposal; providing the endorsed transaction proposal to the application management service; receiving, from the application management service and based on a verification of the endorsed transaction proposal, the latest version of the application and a block of transactions, wherein the block of transactions includes the key value pairs; and storing the block of transactions to a distributed ledger.

An aspect combinable with the general implementations, the key value pairs include date and time of the latest version of an application.

In an aspect combinable with any of the previous aspects, the notification is sent in response to a package file that includes the latest version of the application having been uploaded.

In an aspect combinable with any of the previous aspects, the endorsement policy includes a threshold for a number of proposal response received.

In an aspect combinable with any of the previous aspects, the endorsement policy includes receiving the proposal response from a particular one of the peer nodes.

In an aspect combinable with any of the previous aspects, the operations and/or method includes receiving, from each of the peer nodes, a notification that the block of transactions has been appended a respective peer node distributed ledger.

In an aspect combinable with any of the previous aspects, each of the peer node distributed ledgers and the distributed ledger are identical.

In an aspect combinable with any of the previous aspects, the block of transactions is generated using a smart contract method.

In an aspect combinable with any of the previous aspects, the received proposal response includes a response value, a read set that includes key value read pairs that are to be read in the distributed ledger, and a write set that includes key value write pairs that that are to be written in distributed ledger.

In an aspect combinable with any of the previous aspects, the block of transactions includes a header segment, a metadata segment, and a data segment.

Implementations include systems and processes for a distributed-ledger based system for lifecycle management and distribution of an enterprise application. Particular implementations of the subject matter described in this disclosure can be implemented so as to realize one or more of the following advantages. The system uses blocks of information that serves as the ultimate and immutable sources of information. Such information is provided in real-time or near real-time for user of the respective enterprise applications. The described system prevents inconsistent and out-of-sync data through a distributed ledger that is shared by the members of a permissioned network. The distributed ledger employed by the described system can be used for tracking of secured information for the lifecycle of each enterprise application within the system. With the power of the distributed-ledger technology, this system increases efficiency while also decreasing cost.

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

This disclosure generally describes example systems and methods for an application deployment and management system based on a distributed ledger. The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described or illustrated implementations, but is to be accorded the widest scope consistent with the principles and features disclosed herein.

In view of the foregoing, and as described in further detail herein, implementations of the present disclosure provide a distributed-ledger based system for lifecycle management and distribution of an enterprise application. The disclosed system employs blocks (within the distributed ledger) of information that serves as an immutable record of, for example, the various versions of an enterprise application. These blocks are made available via the disclosed system in real-time or near real-time for various users of each enterprise application. Implementation of the distributed-ledger based system can be used to prevent inconsistent and out-of-sync data through the employment of a distributed ledger. In some implementations, the described system is shared by members of a permissioned network and used for tracking the secured information of an enterprise application during its lifecycle.

The described distributed-ledger based system for the lifecycle management and distribution of an enterprise application provides a single source information for the entire lifecycle of an enterprise application, which improves the consistency and synchronization of data across various systems and/or organizations as well as removes tedious and error-prone information collection processes. Furthermore, employing, a distributed ledger increases the efficiency and decreases the cost of the implementation of various enterprise applications. For example, the described system exploits the nature of a distributed ledger in that it is virtually impossible to tamper or hack records (blocks) thereby providing a secure technology for data protection as well as preventing illegal software usage and/or piracy. Moreover, the described system provides real-time or near real-time access to the information for the entire lifecycle of the supported enterprise applications.

Figure 1:
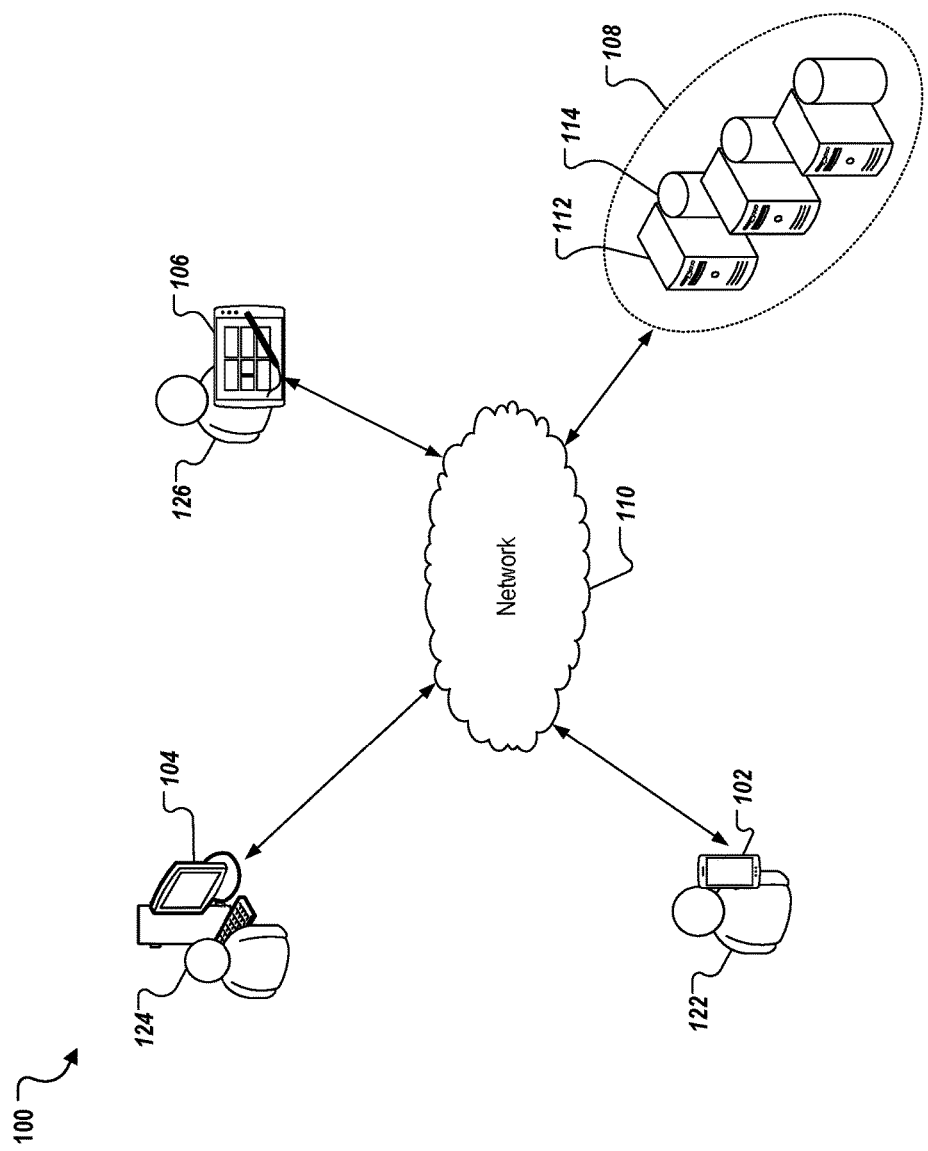
FIG. 1 depicts an example environment that can be employed to execute implementations of the present disclosure.

FIG. 1 depicts an example environment 100 that can be employed to execute implementations of the present disclosure. The example system 100 includes computing devices 102, 104, 106, a back-end system 108, and a network 110. In some implementations, the network 110 includes a local area network (LAN), wide area network (WAN), the Internet, or a combination thereof, and connects web sites, devices (e.g., the computing devices 102, 104, 106) and back-end systems (e.g., the back-end system 108). In some implementations, the network 110 can be accessed over a wired and/or a wireless communications link. For example, mobile computing devices (e.g., the smartphone device 102 and the tablet device 106), can use a cellular network to access the network 110.

In the depicted example, the back-end system 108 includes at least one server system 112 and a data store 114. In some implementations, the at least one server system 112 hosts one or more computer-implemented services, such as a chatbot, that users 122-126 can interact with using the respective computing devices 102-106. For example, the computing devices 102-106 used by respective users 122-126 to receive information and updates over the network 110 for enterprise application through cloud-based services hosted by the back-end system 108. For example, the back-end system 108 may host an application management service for management nodes and/or instance onboarding. Such a cloud platform may host, for example, node-to-node and/or peer-to-peer communication through, for example, a cloud platform application programming interface (API). In some implementations, back-end system 108 includes computer systems using clustered computers and components to act as a single pool of seamless resources when accessed through the network 110. For example, such implementations may be used in data center, cloud computing, storage area network (SAN), and network attached storage (NAS) applications. In some implementations, back-end system 108 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a smartphone, the computing device 104 is provided as a desktop computing device, and the computing device 106 is provided as a tablet-computing device. It is contemplated, however, that implementations of the present disclosure can be realized with any of the appropriate computing devices, such as those mentioned previously.

In some implementations, the back-end system 108 hosts cloud-based services that provide cloud-based services that support the described distributed-ledger based system for the lifecycle management and distribution of enterprise applications. Implementations of the present disclosure are described in further detail herein with reference to an example context. The example context includes an administrator uploading a new version of an enterprise application and nodes running the enterprise application receiving notifications regarding the updates. It is contemplated, however, that implementations of the present disclosure can be realized in any appropriate context. Other example contexts include cloud-based application management services.

In accordance with implementations of the present disclosure, each of the nodes executing the enterprise application can commit application-version-management transactions and maintain a copy of a distributed ledger. An example of a distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a (e.g., public) ledger of transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., version updates, version retrievals, and so forth.) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

Figure 2:
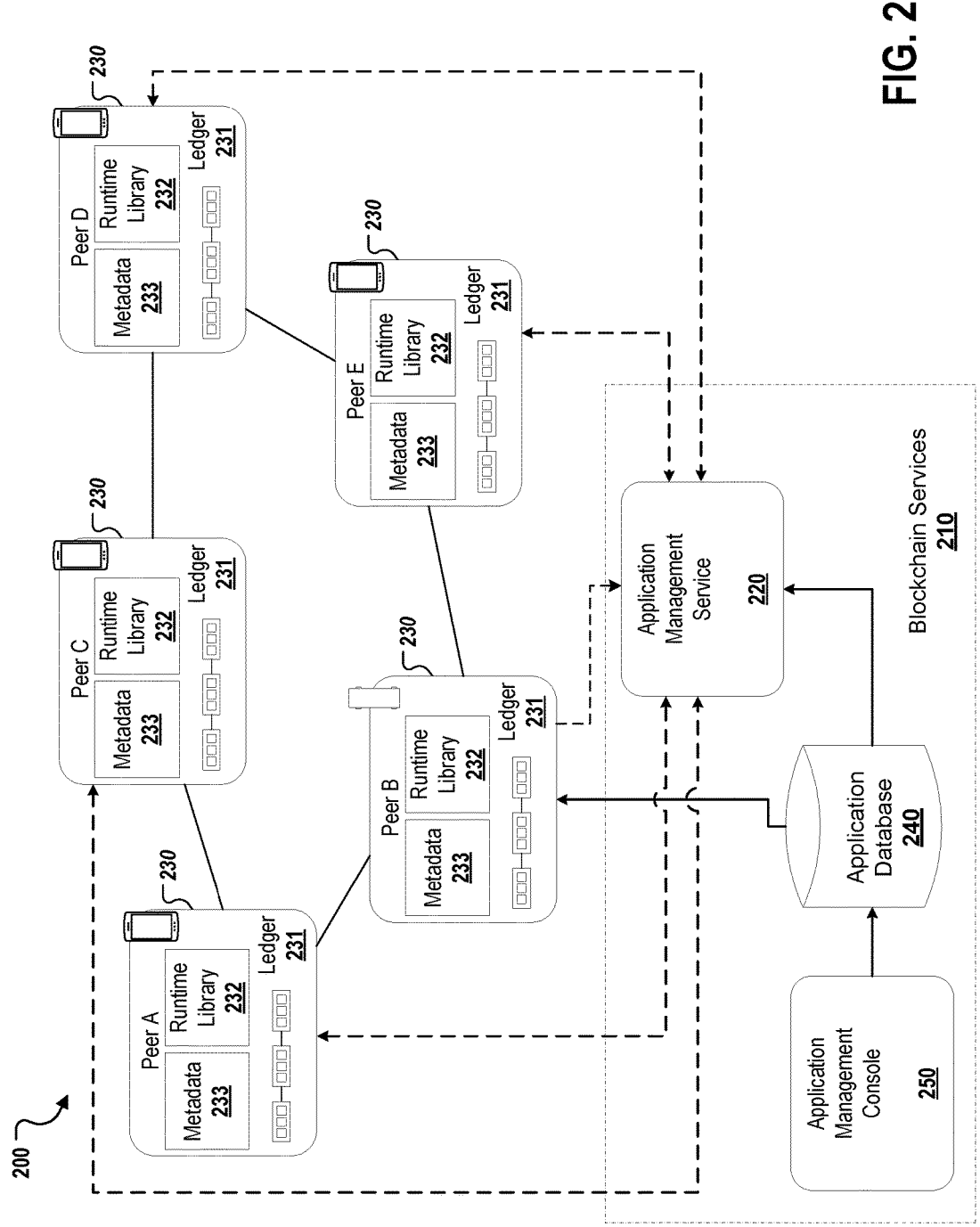
FIG. 2 depicts an example distributed-ledger based system.

FIG. 2 depicts an example distributed-ledger based system 200. As depicted, the example system 200 includes blockchain services 210 and a number of nodes 230 (Peer A, Peer B, Peer C, Peer D, and Peer E). Blockchain services 210 include application management service 220, application database 230, and application management console 250. In some implementations, the blockchain services 210 are provided as instances of cloud-based services hosted by a back-end system, such as back-end system 108 of FIG. 1. Application management service 220 may be implemented, for example, by open standard and able to be run on any cloud infrastructure provider.

Each of the nodes 230 are communication entities, such as application instances, and represent a logical entity. The nodes 230 each include the components ledger 231 and runtime library 232, which are driven with metadata 233. In some implementations, the nodes 230 are running inside an enterprise app on a computing device, such as computing devices 102, 104, and 106 from FIG. 1. In some implementations, for optimal performance, the runtime library 232 is prebuilt with native libraries on the particular platform running the node 230. The runtime library 232 may be configured with the metadata 233 and/or be integrated with various development environments.

Each of the nodes 230 serves as a peer. A peer is a node (e.g., nodes 230) on the network maintaining the state of the ledger 231 and managing chain codes. FIG. 2 depicts five nodes; however, any number of peers may participate in a network. A peer can be an endorser, a committer and/or a submitter. A committer is always an endorser. An endorser executes and endorses transactions. A committer verifies endorsements and validates transaction results. A peer manages an event hub(s) and delivers events to the subscribers.

The nodes 230 communicate to instances of the application management service 220. In some implementations, the application management service 220 provides cloud-enabled service components across an application development and management life cycle. Such service components include services for the support of, for example, application development, integration, testing, releasing, deployment, updating, infrastructure management, and mobile and traditional testing.

In some implementations, the nodes 230 may act as both clients and transaction endorsers. For example, Peer A may have components running on a device, and a hosted cloud application management service 220 instance. The nodes 230 can also act solely as transaction endorsers. For example, Peer B may be running on a cloud-based server. In some implementations, the node 230 may act as a client to submit an application-version-management-transaction invocation to the endorsers, and broadcast transaction proposals. It can also act as a transaction endorser to endorse and validate the transaction. For example, in our environment, Peer A, acts as a client, where the end user is using an enterprise app on a mobile device and submitting a version upgrade transaction invocation. Peer B and Peer C are acting as endorsers, which endorse and validate the app version deployment and management transaction invocated by client Peer A.

Each of the nodes 230 can commit application-version-management transactions and maintain a copy of the ledger 231. The ledger 231 provides a verifiable history of all application versions and version changes for the respective enterprise application serviced by the example system 200. As such, the ledger 231 keeps records of the world state resulting from every transaction of the application version deployment and management globally, including, for example, valid and successful transactions and unsuccessful or invalid attempts to change state. A transaction can be, for example, a version check, or a version upgrade and/or deployment that occurs on any peer, such as nodes 230 (e.g., Peers A-E). In some implementations, the ledger 231 is as a totally ordered chain of blocks of transactions where each block includes a header and body. The header may include a hash of the prior block's header, and the body may include a sequence of transactions (e.g., the proposal, endorsement (s), and so forth).

A copy of the ledger 231 is kept with all peers (e.g., nodes 230) and is constructed as a totally ordered chain of blocks of (valid or invalid) transactions. The ordered chain of block imposes the total order of blocks in the ledger 231, and as such, imposes a total order across all transactions. Furthermore, each transaction results in a set of application version management key-value pairs that are committed to the ledger 231.

In some implementations, the application management console 250 is an administration console, where an administrator can use a web-based user interface (UI) to access the information on the entire lifecycle for each supported the enterprise application. Such information may include deployment and versioning management information, which may be stored in application database 240. The application management console 250 may also be used to generate analysis reports. Administrators may also upload a new version of an enterprise app and send notifications to all nodes 230 to inform them of the availability of a new version. The application database 240 may be any suitable type of data storage, such as a cloud service, data warehouse, distributed big data platform, relational and/or non-relational databases, and so forth.

Figure 3:
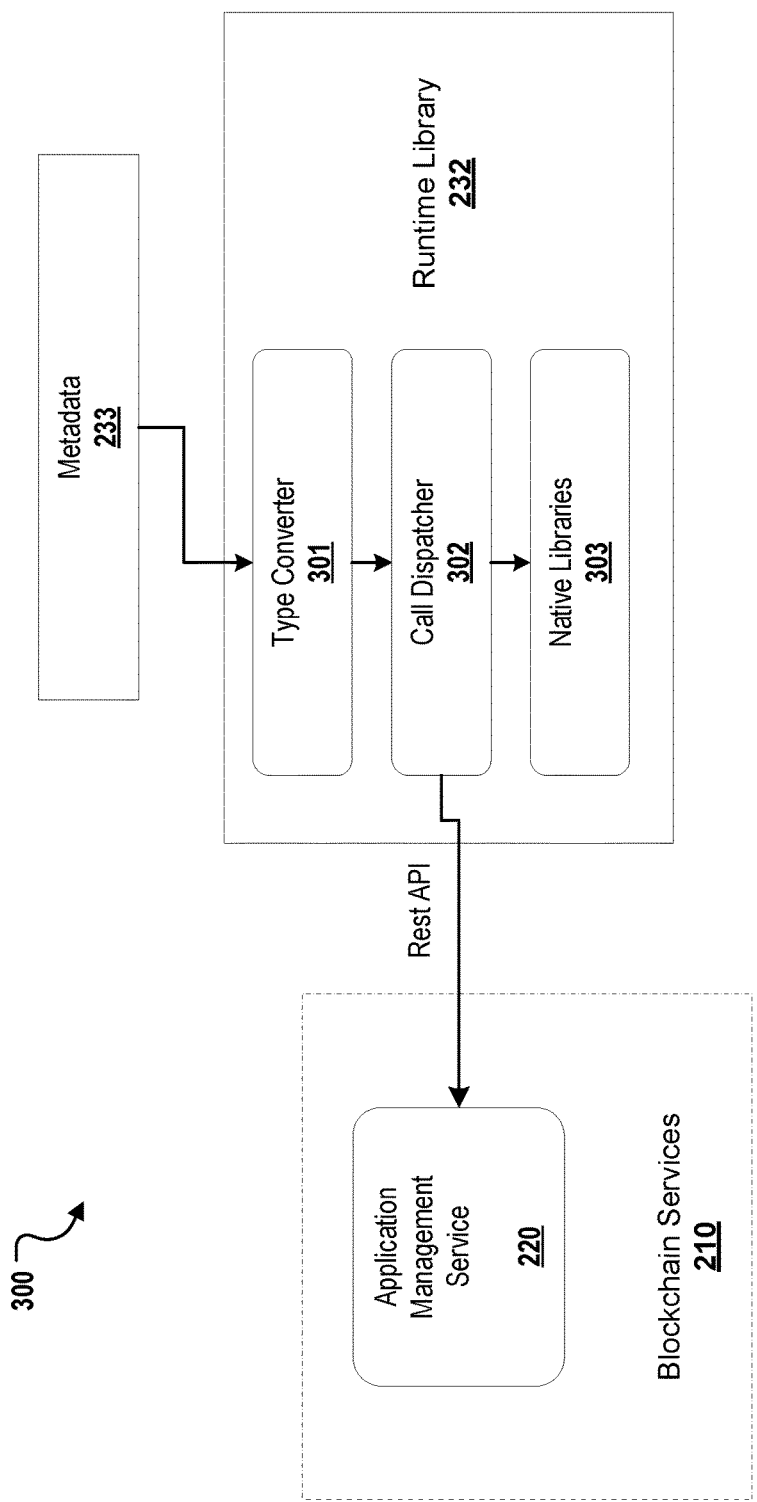
FIG. 3 depicts an example architecture of a runtime library employed within the distributed-ledger based system.

FIG. 3 depicts an example architecture 300 of the runtime library 232. In some implementations, the runtime library may run on a mobile computing device, such as computing devices 102 and 106 of FIG. 1. In such examples, the computational power of the device may be limited. Accordingly, the runtime library 232 can be designed with a lightweight architecture, where only certain functions are actually executed on the device. In the depicted example, type converter 301 and native libraries 303 may be running on the respective device, while the computing intensive functions (e.g. blockchain transaction endorse, block validation, and so forth), are dispatched through call dispatcher 302 to an instance of application management service 220. In some implementations, native libraries 303 are libraries that include code that has been compiled for a specific hardware architecture or operating system (e.g., native code). In some implementations, the type converter 301 converts objects defined in, for example, metadata to different types such that different native libraries may be loaded based on the platform (e.g., iOS or Android).

Figure 4:
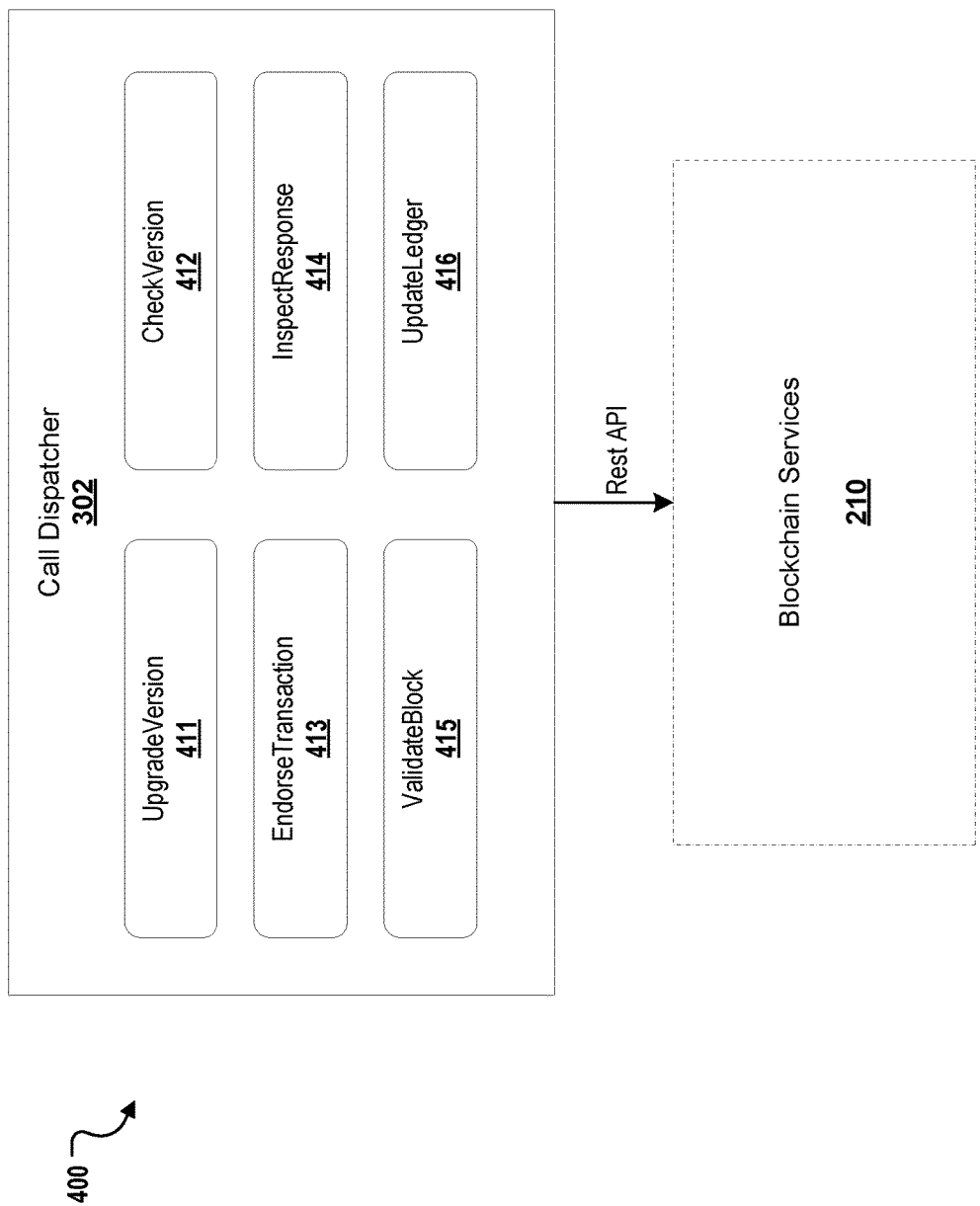
FIG. 4 depicts an example architecture of a call dispatcher of the runtime library employed within the distributed-ledger based system.

FIG. 4 depicts an example architecture 400 of the call dispatcher 302. The example architecture 400 includes function calls UpgradeVersion 411, CheckVersion 412, EndoreTransaction 413, InspectRepsonse 414, Validate-Block 415, and UpdateLedger 416. These function calls can be employed to distribute an application update to various peers, such as peers 230, where the application is installed or in use. At a high level, the transaction flow to distribute an application update may include the following steps. A peer (e.g., the submitter) may send a version upgrade transaction proposal to endorsing peers. The endorsing peers (e.g., the endorsers) verify the signature of the version upgrade transaction proposal and approve the transaction. A proposal response, which may include a response value, a read set, and a write set, is returned to the submitter along with an endorsement signature from each of the endorsers. The submitter verifies the received endorsers' signatures and compares the proposal responses to each other to determine if a specified endorsement policy has been fulfilled. The submitter assemble the endorsements along with the transaction proposal into an endorsed-transaction-proposal, which is sent to an application management service, such as application management service 220. The application management service verifies the endorsed-transaction-proposal and sends a new version of the application package (e.g., a zip file) to the submitter. The submitter installs the application update accordingly. A new block of transactions is created by the application management service. The new block of transactions is delivered to all peers (e.g., the submitter and endorser). The peers append the block to their respective distributed ledger, such as ledger 231, and notify the submitter that the block has been appended.

A detailed example scenario of the above described transaction flow to distribute an application update using the function calls depicted in FIG. 4 may include the following steps. An administrator prepares the latest version of an enterprise application to start a workflow. For example, an administrator may prepare a zip or package file in any suitable format. The administrator may then be authenticated by the enterprise cloud and be granted access to the application management console 250. Once authenticated, the administrator may then upload the prepared package to the application database 240 through the application management console 250. When the package is uploaded, a push notification may be sent via the application management service 120 to the nodes 230 to inform them of the availability of the latest version. In some implementations, a pull model maybe employed where, for example, each of the node 230 pings the application management console for version updates.

Continuing with the example scenario, when an end user at Peer A receives the push notification, he or she may accept (e.g., press a prompted "OK" button) to start the version upgrade process. This action loads the metadata 233 driven runtime library 232 on Peer A to execute the UpgradeVersion function 411, which generates a version upgrade transaction proposal. In some implementations, this transaction proposal is a request to generate a new block on the distributed ledgers 231. Such a block may include key value pairs for the new version of the application, such as date, time, an application identifier, the application name, internal version number; semantic version, device qualifier, and so forth. The UpgradeVersion function call 411 may also use the end user's cryptographic credentials to produce a unique signature for this version upgrade transaction proposal.

Endorsing peers, which can be any of Peers B, C, D, and E, can verify the signature of this version upgrade transaction proposal and approve the transaction. With the transaction proposal inputs (e.g., the key value pairs and the signature) as arguments, endorsing peers invoke the EndorseTransaction function 403. The EndorseTransaction function 403 is then executed to produce transaction results that may include a response value, a read set, and a write set. In some implementations, a response value includes a response status (e.g., an HTTP status code 200 (SUCCESS) indicating the endorsement transaction was successful). A read set may include versions of key value pairs that are to be read in the distributed ledger 231. A write set may include the versions of key value pairs that are to be written in distributed ledger 231. At later stage, the committer may use the read set to check the validity of a transaction by checking whether the read set actually resides in the existing distributed ledger 231 and the write set to create a new block. The set of these values (e.g., the response value, the read set, and the write set), along with the endorsing peer's signature, is then passed back as a "proposal response" to Peer A (e.g., the submitter).

The received proposal responses may then be inspected by Peer A using the InspectResponse function 314, which verifies the endorsing peers' signatures and compares the proposal responses to determine if the specified endorsement policy has been fulfilled. For example, the InspectResponse function 314 may compare the responses received from the peers to ensure that they are all the same and/or determines whether a specified endorsement policy has been fulfilled. Such an endorsement policy can be curated based on the customer requirement and the desired level of security. For example, an endorsement policy may specify that a transaction be endorsed by a minimum number or minimum percentage of endorsing peers. The endorsement policy may also specify that a particular peer, such as Peer B, endorse the transaction.

Peer A (e.g., the submitter) may then assemble the endorsements along with the transaction proposal into an endorsed transaction proposal. The endorsed transaction proposal is submitted within a transaction request to the application management service 220. This transaction request may include the write set, which includes new key value pairs for the new version (e.g., the date and time information, the signatures of the endorsing peers, and so forth). After the application management service 220 receives and verifies the transaction request, the respective new version application package is retrieved from the application database 240 and a new block of transactions is created. For example, the new block of transaction may be generated using a smart contract (e.g., self-executing contracts, blockchain contracts, digital contracts) method. In some implementations, the block of transactions includes three segments: the header, metadata, and data. The header segment may include, for example, a unique block number, hash of the previous block's header, and hash of the data segment of the current block. The block metadata segment may include, for example, signature on the block generation, reference to valid/invalid transaction in a block, and so forth. The data segment may include, for example, a transaction type, a transaction identifier, timestamp information, a submitter identifier, the submitter's signature, a list of endorsement records that can include endorser identifiers, signatures, and so forth, a proposal hash, a response status, and the read set and the write set (see above). In some implementations, this new block is created by the application management service through the cloud and the block is added to Peer A in later stage by executing UpdateLedger function.

The new version application package is then delivered to Peer A (e.g., the submitter) and the block of transactions is delivered to all peers (including Peer A). On each peer (Peer B-E), the transaction(s) within the block are validated using the ValidateBlock function 415 to ensure that the endorsement policy is fulfilled, and is accordingly tagged as being either valid or invalid. Once Peer A receives the new version application package, it will install the package and upgrade the application accordingly. Each peer (including Peer A) will then execute the UpdateLedger function 416 to append the block to the blockchain (e.g., the ledger 231) and notify Peer A that the transaction has been immutably appended to the chain.

Consequently, each peer (nodes 230) will have all of the versioning information that is saved in the ledger 231, which serves as the single source of all information of the entire lifecycle of the respective enterprise app. As such, the ledger 231 serves as the immutable system for recording version information, thus preventing inconsistent and out-of-sync data as well as preventing the records of deployment and versioning management of the enterprise application from being tampered with or hacked. Moreover, by accessing the ledger 231 on each node, the information regarding the entire lifecycle versioning of the respective enterprise application, may be received in real-time or near real-time.

The above describe process may then be repeated by each Peer to install the application update. As such, version updates installed to every Peer within the described system may be considered as a new transaction. In this way, ledger 231 will contain the versioning management information for the respective application.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of a distributed-ledger based system, such as depicted in FIGS. 1-6.

Figure 5:
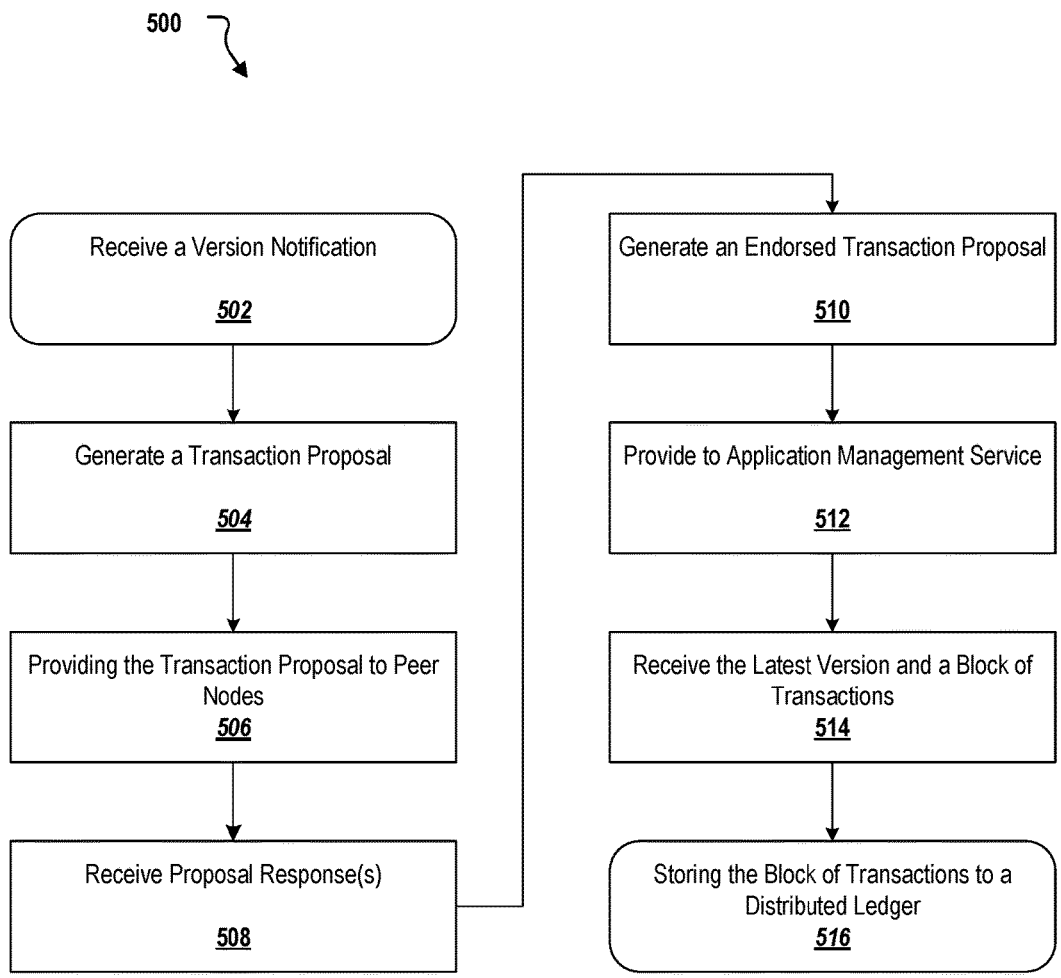
FIG. 5 depicts a flow diagram of an example distributed-ledger based process employed to manage and distribute an enterprise application during its lifecycle.

FIG. 5 depicts a flow diagram of an example distributed-ledger based process 500 employed to manage and distribute an enterprise application during its lifecycle. For clarity of presentation, the description that follows generally describes method 500 in the context of FIGS. 1-4 and 6. However, it will be understood that method 500 may be performed, for example, by any other suitable system, environment, software, and hardware, or a combination of systems, environments, software, and hardware as appropriate. In some implementations, various operations of method 500 can be run in parallel, in combination, in loops, or in any order. At 502, a notification regarding an availability of a latest version of an application is received from an application management service. For example, the notification may sent in response to a package file that includes the latest version of the application being uploaded. The application management service may be a cloud-based service. From 502, the process 500 proceeds to 504. At 504, a transaction proposal that includes key value pairs for the latest version and a unique signature for the latest version is generated. The key value pairs may include date and time of the latest version of an application. The unique signature may be generated using cryptographic credentials. From 504, the process 500 proceeds to 506. At 506, the transaction proposal is provide to a plurality of peer nodes. From 506, the process 500 proceeds to 508. At 508, a proposal response is received from at least a portion of the peer nodes. The received proposal response(s) may include a verification of the unique signature, a response value, a read set, and a write set. From 508, the process 500 proceeds to 510. At 510, an endorsed transaction proposal is generated based on validating the proposal responses according to an endorsement policy. The endorsed transaction proposal may include the received proposal response and the transaction proposal. The endorsement policy may include a threshold for a number of proposal response received and/or receiving the proposal response from a particular one of the peer nodes. From 510, the process 500 proceeds to 512. At 512, the endorsed transaction proposal is provided to the application management service. From 512, the process 500 proceeds to 514. At 514, the latest version of the application and a block of transactions is received from the application management service based on a verification of the endorsed transaction proposal. The block of transactions may include the key value pairs. From 514, the process 500 proceeds to 516. At 516, the block of transactions are stored to a distributed ledger. From 516, the process 500 ends. Process 500 may optionally include receiving a notification from each of the peer nodes that the block of transactions has been appended a respective peer node distributed ledger. The peer node distributed ledgers and the distributed ledger may be identical.

Figure 6:
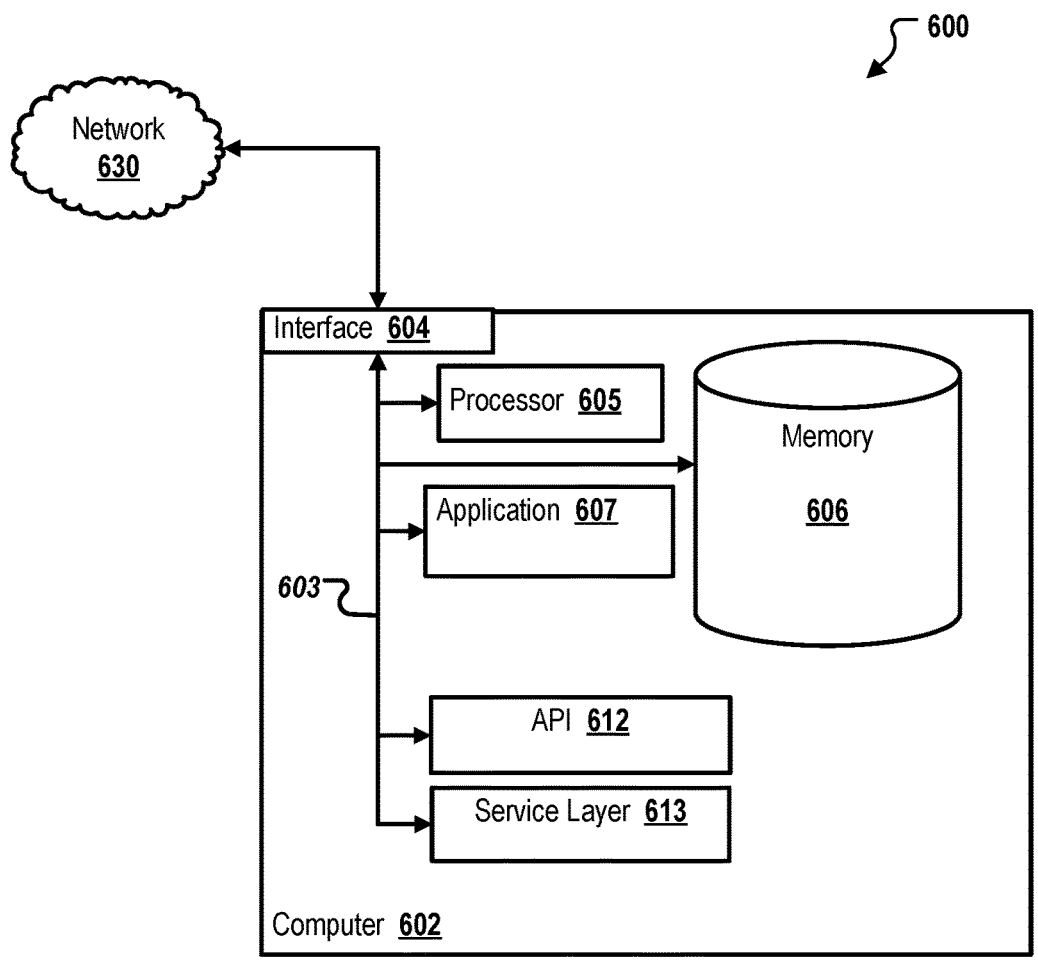
FIG. 6 depicts a block diagram of an exemplary computer system used to provide computational functionalities associated with described algorithms, methods, functions, processes, flows, and procedures as described in the instant disclosure, according to an implementation.

FIG. 6 depicts a block diagram of an exemplary computer system 600 used to provide computational functionalities associated with described algorithms, methods, functions, processes, flows, and procedures as described in the instant disclosure, according to an implementation. The illustrated computer 602 is intended to encompass any computing device such as a server, desktop computer, laptop or notebook computer, wireless data port, smart phone, personal data assistant (PDA), tablet computing device, one or more processors within these devices, or any other suitable processing device, including both physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630 (whether illustrated or not). Generally, the interface 604 comprises logic encoded in software or hardware (or a combination of software and hardware) and operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a memory 606 that holds data for the computer 602 or other components (or a combination of both) that can be connected to the network 630 (whether illustrated or not). For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system that includes computer 602, with each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method executed by one or more processors, the method comprising:
   receiving, from an application management service, a notification regarding an availability of a latest version of an application;
   generating a transaction proposal that includes key value pairs for the latest version and a unique signature for the latest version;
   providing the transaction proposal to a plurality of peer nodes;
   receiving a proposal response from at least a portion of the peer nodes, each of the proposal responses including a verification of the unique signature;
   generating an endorsed transaction proposal based on validating the proposal responses according to an endorsement policy, wherein the endorsed transaction proposal includes the received proposal response and the transaction proposal;
   providing the endorsed transaction proposal to the application management service;
   receiving, from the application management service and based on a verification of the endorsed transaction proposal, the latest version of the application and a block of transactions, wherein the block of transactions includes the key value pairs; and
   storing the block of transactions to a distributed ledger.

2. The method of claim 1, wherein the key value pairs include date and time of the latest version of an application.

3. The method of claim 1, wherein the notification is sent in response to a package file that includes the latest version of the application having been uploaded.

4. The method of claim 1, wherein the endorsement policy includes a threshold for a number of proposal response received.

5. The method of claim 1, wherein the endorsement policy includes receiving the proposal response from a particular one of the peer nodes.

6. The method of claim 1, further comprising:
   receiving, from each of the peer nodes, a notification that the block of transactions has been appended a respective peer node distributed ledger.

7. The method of claim 6, wherein each of the peer node distributed ledgers and the distributed ledger are identical.

8. The method of claim 1, wherein the block of transactions is generated using a smart contract method.

9. The method of claim 1, wherein the received proposal response includes a response value, a read set that includes key value read pairs that are to be read in the distributed ledger, and a write set that includes key value write pairs that that are to be written in distributed ledger.

10. The method of claim 1, wherein the block of transactions includes a header segment, a metadata segment, and a data segment.

11. One or more non-transitory computer-readable storage media coupled to one or more processors and having instructions stored thereon which, when executed by the one or more processors, cause the one or more processors to perform operations comprising:
receiving, from an application management service, a notification regarding an availability of a latest version of an application;
generating a transaction proposal that includes key value pairs for the latest version and a unique signature for the latest version;
providing the transaction proposal to a plurality of peer nodes;
receiving a proposal response from at least a portion of the peer nodes, each of the proposal responses including a verification of the unique signature;
generating an endorsed transaction proposal based on validating the proposal responses according to an endorsement policy, wherein the endorsed transaction proposal includes the received proposal response and the transaction proposal;
providing the endorsed transaction proposal to the application management service;
receiving, from the application management service and based on a verification of the endorsed transaction proposal, the latest version of the application and a block of transactions, wherein the block of transactions includes the key value pairs; and
storing the block of transactions to a distributed ledger.

12. The one or more non-transitory computer-readable storage media of claim 11, wherein the key value pairs include date and time of the latest version of an application.

13. The one or more non-transitory computer-readable storage media of claim 11, wherein the notification is sent in response to a package file that includes the latest version of the application having been uploaded.

14. The one or more non-transitory computer-readable storage media of claim 11, wherein the endorsement policy includes a threshold for a number of proposal response received.

15. The one or more non-transitory computer-readable storage media of claim 11, wherein the endorsement policy includes receiving the proposal response from a particular one of the peer nodes.

16. A system, comprising:
one or more processors; and
a computer-readable storage device coupled to the one or more processors and having instructions stored thereon which, when executed by the one or more processors, cause the one or more processors to perform operations comprising:
receiving, from an application management service, a notification regarding an availability of a latest version of an application;
generating a transaction proposal that includes key value pairs for the latest version and a unique signature for the latest version, the unique signature generated using cryptographic credentials;
providing the transaction proposal to a plurality of peer nodes;
receiving a proposal response from at least a portion of the peer nodes, each of the proposal responses including a verification of the unique signature;
generating an endorsed transaction proposal based on validating the proposal responses according to an endorsement policy, wherein the endorsed transaction proposal includes the received proposal response and the transaction proposal;
providing the endorsed transaction proposal to the application management service;
receiving, from the application management service and based on a verification of the endorsed transaction proposal, the latest version of the application and a block of transactions, wherein the block of transactions includes the key value pairs; and
storing the block of transactions to a distributed ledger.

17. The system of claim 16, further comprising:
receiving, from each of the peer nodes, a notification that the block of transactions has been appended a respective peer node distributed ledger.

18. The system of claim 17, wherein each of the peer node distributed ledgers and the distributed ledger are identical.

19. The system of claim 16, wherein the block of transactions is generated using a smart contract method.

20. The system of claim 16, wherein the received proposal response includes a response value, a read set that includes key value read pairs that are to be read in the distributed ledger, and a write set that includes key value write pairs that that are to be written in distributed ledger.

* * * * *